United States Patent
Uehara et al.

(10) Patent No.: US 12,242,656 B2
(45) Date of Patent: Mar. 4, 2025

(54) SEAL MANAGEMENT METHOD AND SEAL MANAGEMENT APPARATUS

(71) Applicant: GFS Corporation, Tokyo (JP)

(72) Inventors: Toshiyuki Uehara, Chiba (JP); Yoshiaki Takahashi, Tokyo (JP)

(73) Assignee: GFS Corporation, Tokyo (JP)

( * ) Notice: Subject to any disclaimer, the term of this patent is extended or adjusted under 35 U.S.C. 154(b) by 402 days.

(21) Appl. No.: 17/676,731

(22) Filed: Feb. 21, 2022

(65) Prior Publication Data

US 2022/0179999 A1     Jun. 9, 2022

Related U.S. Application Data

(63) Continuation of application No. PCT/JP2021/026656, filed on Jul. 15, 2021.

(30) Foreign Application Priority Data

Oct. 6, 2020   (JP) ................................. 2020-169177

(51) Int. Cl.
*G06F 16/27* (2019.01)
*G06F 21/31* (2013.01)
*G06F 21/64* (2013.01)
*G06F 21/62* (2013.01)

(52) U.S. Cl.
CPC .............. *G06F 21/64* (2013.01); *G06F 16/27* (2019.01); *G06F 21/31* (2013.01); *G06F 21/6218* (2013.01)

(58) Field of Classification Search
CPC ........ G06F 21/64; G06F 16/27; G06F 16/273; G06F 16/275; G06F 16/278; G06F 21/31; G06F 21/6218
See application file for complete search history.

(56) References Cited

U.S. PATENT DOCUMENTS

| | | | |
|---|---|---|---|
| 10,554,407 B1 * | 2/2020 | Greco | G06F 16/178 |
| 2017/0272245 A1 * | 9/2017 | Norton | H04L 9/0863 |
| 2019/0253260 A1 | 8/2019 | Uehara et al. | |
| 2019/0287105 A1 * | 9/2019 | Fedorov | G06Q 20/401 |
| 2020/0127826 A1 * | 4/2020 | Ebrahimi | G06F 21/32 |

(Continued)

FOREIGN PATENT DOCUMENTS

| | | |
|---|---|---|
| JP | 2002116696 A | 4/2002 |
| JP | 2018182487 A | 11/2018 |

(Continued)

*Primary Examiner* — Merilyn P Nguyen
(74) *Attorney, Agent, or Firm* — HAUPTMAN HAM, LLP

(57) ABSTRACT

A seal management apparatus for managing an electronic sealing service performs the steps of receiving seal-required data to be used for the sealing service from a user terminal of a user of the sealing service, generating (a) a seal secret key for sealing the seal-required data and (b) a seal public key used for verifying the seal, in a working memory, when the seal-required data is received, registering the seal public key in a blockchain, acquiring a seal identifier that is an identifier for acquiring the seal public key registered in the blockchain from the blockchain, generating a sealed file by affixing a signature of the seal secret key to a file containing the seal-required data and the seal identifier, deleting the seal secret key from the working memory, and transmitting the seal identifier to the user terminal.

10 Claims, 16 Drawing Sheets

(56) References Cited

U.S. PATENT DOCUMENTS

2021/0397678 A1    12/2021  Ohashi et al.
2023/0134095 A1*    5/2023  Mitch ................ G06Q 20/3829
                                                      705/51

FOREIGN PATENT DOCUMENTS

| JP | 2019164683 A | 9/2019 |
| JP | 2020135690 A | 8/2020 |
| WO | 2020085378 A1 | 4/2020 |

* cited by examiner

| Purpose of use<br>Data type | Sealing | Affixing signature of service provider |
|---|---|---|
| SECRET KEY | SEAL SECRET KEY<br>(Stored in: None. Deleted after sealing) | SERVICE SECRET KEY<br>(Stored in: Storage) |
| PUBLIC KEY | SEAL PUBLIC KEY<br>(Stored in: Blockchain) | SERVICE PUBLIC KEY<br>(Stored in: Blockchain) |
| IDENTIFIER | SEAL IDENTIFIER<br>(Stored in: User terminal) | SERVICE IDENTIFIER<br>(Stored in: Storage) |

FIG. 4

SEAL MANAGEMENT METHOD AND SEAL MANAGEMENT APPARATUS

CROSS-REFERENCE TO RELATED APPLICATIONS

The present application is a continuation application of International Application number PCT/JP2021/026656, filed on Jul. 15, 2021, which claims priority under 35 U.S.C. § 119(a) to Japanese Patent Application No. 2020-169177, filed on Oct. 6, 2020. The contents of this application are incorporated herein by reference in their entirety.

BACKGROUND OF THE INVENTION

In recent years, with the rapid development of network technologies such as the Internet, there has been an increase in the number of cases where documents that were previously printed on paper are now being replaced by electronic documents. For this reason, Japanese Unexamined Patent Application Publication No. 2020-135690, for example, discloses a system that allows an approver to identify himself/herself and approve a document by affixing, to a file to be approved, seal data of an electronic seal of the approver.

The technology described above uses a conventional password to protect the seal data of the electronic seal for identifying the approver. In this case, the confidentiality of the electronic seal is equivalent to the confidentiality of the conventional password, which does not always guarantee a high level of security.

BRIEF SUMMARY OF THE INVENTION

The present disclosure focuses on these points, and an object of the present disclosure is to provide a technique for increasing security of electronic sealing used for confirmation of a source.

The first aspect of the present disclosure is a seal management method, wherein a seal management apparatus for managing an electronic sealing service performs the steps of receiving seal-required data to be used for the sealing service from a user terminal of a user of the sealing service, generating (a) a seal secret key for sealing the seal-required data and (b) a seal public key used for verifying the seal, in a working memory, when the seal-required data is received, registering the seal public key in a blockchain, acquiring a seal identifier that is an identifier for acquiring the seal public key registered in the blockchain from the blockchain, generating a sealed file by affixing a signature of the seal secret key to a file containing the seal-required data and the seal identifier, deleting the seal secret key from the working memory, and transmitting the seal identifier to the user terminal.

The second aspect of the present disclosure is a seal management apparatus for managing an electronic sealing service that includes a receiving part that receives seal-required data to be used for the sealing service, from a user terminal of a user of the sealing service, a key pair generation part that generates (a) a seal secret key for sealing the seal-required data and (b) a seal public key used for verifying the seal, in a working memory, when the seal-required data is received, a blockchain operation part that registers the seal public key in a blockchain and acquires a seal identifier that is an identifier for acquiring the seal public key registered in the blockchain, from the blockchain, a seal execution part that generates a sealed file by affixing a signature of the seal secret key to a file containing the seal-required data and the seal identifier, a key deleting part that deletes the seal secret key from the working memory, and a transmitting part that transmits the seal identifier to the user terminal.

The third aspect of the present disclosure is an information processing method, wherein a user terminal of a user of an electronic sealing service performs the steps of generating a hash value of seal-required data to be used for the sealing service, generating (a) a user seal secret key for affixing a signature to a verification information containing the hash value and (b) a user public key corresponding to the user seal secret key, in a working memory, generating signed verification information to which the verification information is affixed a signature using the user seal secret key, transmitting the signed verification information and the user public key to a seal management apparatus that manages the sealing service, and deleting the user seal secret key from the working memory, wherein the seal management apparatus performs the steps of receiving the signed verification information and the user public key from the user terminal of the user of the sealing service, generating (a) a seal secret key for sealing the signed verification information and (b) a seal public key used for verifying the seal, in a working memory, storing the seal public key and the user public key in association with an seal identifier in a storage, generating sealed verification information by affixing a signature of the seal secret key to the signed verification information, transmitting the sealed verification information and the seal identifier to the user terminal, and deleting the seal secret key from the working memory.

It should be noted that any arbitrary combination of the above-described constituent elements, and the conversion of the expression of the present disclosure among a method, an apparatus, a system, a computer program, a data structure, a recording medium, and the like are also effective as an embodiment of the present disclosure.

BRIEF DESCRIPTION OF THE DRAWINGS

FIG. 4 is a table showing various keys and identifiers used in the seal management system according to the first embodiment.

DETAILED DESCRIPTION OF THE INVENTION

Technical Premise of Embodiment

Figure 1:
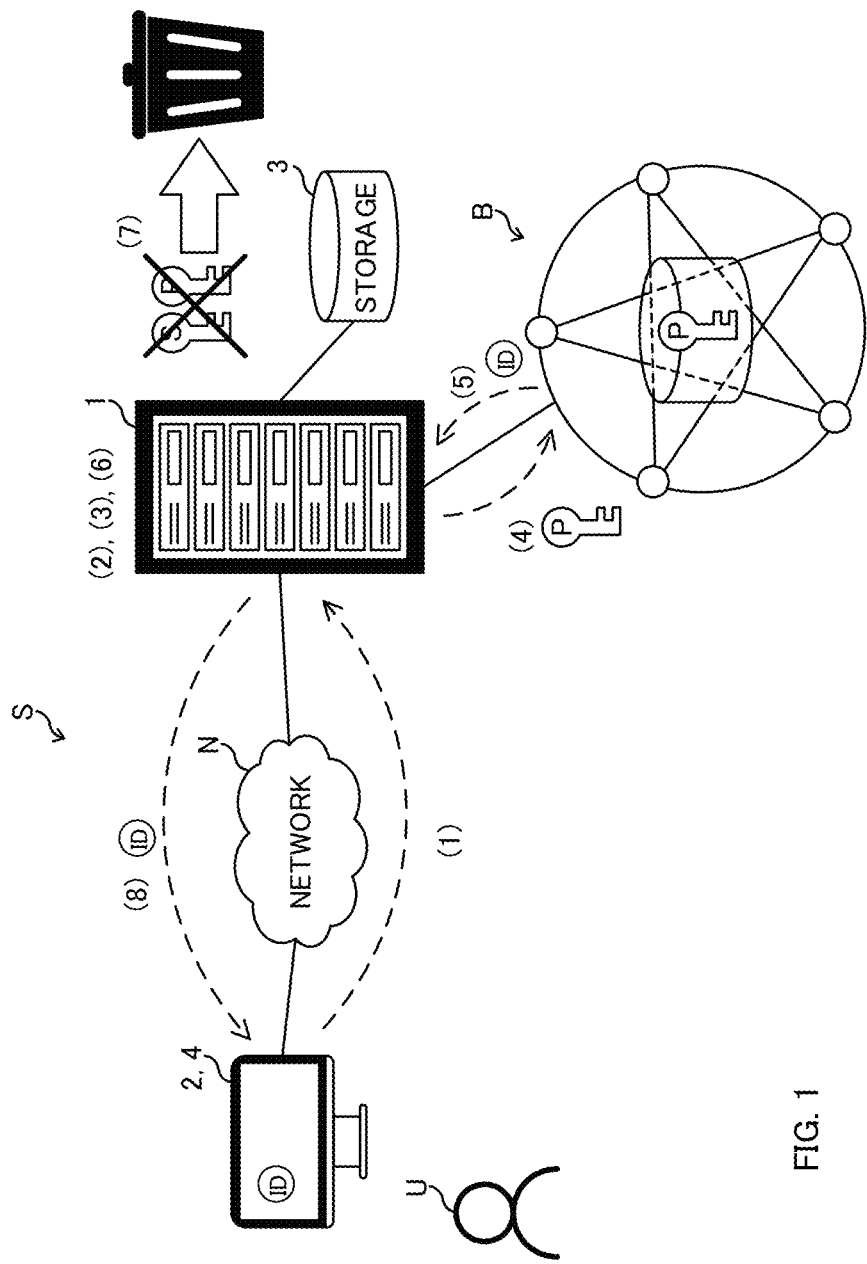
FIG. 1 schematically shows an outline of an entire configuration of a seal management system according to a first embodiment.

The present disclosure will be explained on the basis of the first and second embodiments. Before explaining the seal management system according to these embodiments, the nature of public key cryptography, which is a premise of the system, will be briefly explained. The seal management system according to the embodiments uses public key cryptography capable of encryption, signing, and key exchange. The Rivest-Shamir-Adleman (RSA) cryptosystem is known as such a public key cryptosystem, and the RSA cryptosystem is assumed to be used in the embodiment. Since the RSA cryptosystem is a known technique, description of its algorithm is omitted.

The RSA cryptosystem generally includes a key generation algorithm, an encryption algorithm, and a decryption algorithm, which are implemented by computer programs. The computer executes the key generation algorithm to generate a key pair including a secret key and a public key.

In the RSA cryptosystem, the public key is generally used in the encryption algorithm for converting plaintext into ciphertext. Therefore, the public key is sometimes referred to as an encryption key. Further, the secret key is used in the decryption algorithm for decrypting the ciphertext encrypted by the public key to restore said ciphertext to the plaintext. Therefore, the secret key is sometimes referred to as a decryption key. In the RSA cryptosystem, it is difficult to decrypt data encrypted using the public key within a realistic time without using the secret key.

Even with the public key of the RSA cryptosystem, it is currently difficult to find the secret key corresponding to that public key within a realistic time. In the RSA cryptosystem, the computer that generated the key pair usually stores the secret key safe on its own and distributes the public key to other devices. The other devices encrypt information using the distributed public key, and transmit the encrypted information to the computer that generated the secret key. Since the ciphertext is difficult to be decrypted unless the computer possesses the secret key corresponding to the public key that encrypted the ciphertext, the other devices can safely transmit information to the device possessing the secret key.

In the public key cryptosystem that allows for key exchange such as the RSA public key cryptosystem, when plaintext data is processed with the decryption algorithm (that is, the plaintext is "decrypted" using a secret key), the resulting data is the ciphertext that cannot be decrypted. When this ciphertext is processed with the encryption algorithm (that is, the data decrypted using the secret key is "encrypted" using the public key), the original plaintext data is restored. That is, in the RSA public key cryptosystem, the secret key and the public key can be interchanged for encryption and decryption, and the secret key can be used for "encryption" and the public key can be used for "decryption." However, since a secret key can be used to generate a corresponding public key, it is not usual for the computer that generated the secret key to distribute the secret key to other devices for use in encryption.

When the RSA public key cryptosystem is used for an electronic signature, a computer generates a signature by executing a decryption algorithm on data to be signed or a hash value of said data. A device that verifies signatures can confirm that the signature was generated by the computer that possesses the secret key if the original data or the hash value said data is obtained as a result of processing the signature using the encryption algorithm. This is because, in general, a secret key is possessed only by the computer that generated the secret key.

Outline of First Embodiment

An outline of processes executed in a seal management system S according to the first embodiment and a data flow will be described below in the order of (1) to (8) with reference to FIG. 1 on the premise of the technology described above. The numbers correspond to (1) to (8) in FIG. 1.

FIG. 1 schematically shows an outline of an entire configuration of the seal management system S according to the first embodiment. As shown in FIG. 1, the seal management system S includes a seal management apparatus 1 for managing an electronic sealing service, a user terminal 2 used by a user U of the sealing service, a storage 3 for storing various keys and identifiers used in the seal management system S, an inspector terminal 4 used by an inspector who inspects the sealing service, and a blockchain B.

The seal management apparatus 1 and the user terminal 2 or the inspector terminal 4 may be connected via a network N such as the Internet. In the example of the seal management system S shown in FIG. 1, the blockchain B is a private blockchain or a consortium blockchain that includes five nodes. Details of the inspector terminal 4 will be described later.

(1) The user terminal 2 transmits data to be used for the sealing service (hereinafter, referred to as "seal-required data") to the seal management apparatus 1 via the network N.

(2) The seal management apparatus 1 receives the seal-required data from the user terminal 2.

(3) The seal management apparatus 1 generates a seal secret key used for sealing and a seal public key corresponding to said seal secret key in a working memory (not shown in figures) of the seal management apparatus 1. In FIG. 1, the seal public key is represented by a key attached with "P" which is the first letter of "public," and the seal secret key is represented by a key attached with "S" which is the first letter of "secret."

(4) The seal management apparatus 1 registers the seal public key in the blockchain B.

(5) The seal management apparatus 1 acquires a seal identifier, which is information for retrieving a seal public key from the blockchain B, from said blockchain B. The seal identifier corresponds one-to-one with the seal public key, and is information uniquely associated with each sealing service. It should be noted that the seal identifier is represented by "ID" indicating "identification" in FIG. 1.

(6) The seal management apparatus 1 signs a file containing the seal-required data and the seal identifier received from the user terminal 2 with a signature of the seal secret key related to said file. Thereby, the seal management apparatus 1 generates a sealed file and stores the file safely in the storage 3.

(7) After registering the seal public key in the blockchain B and generating the sealed file using the seal secret key, the seal management apparatus 1 safely deletes the seal secret key and the seal public key remaining in the working memory such that they cannot be restored. Accordingly, the seal secret key corresponding to the seal public key registered in the blockchain B completely disappears, and it will no longer be possible to provide the sealing service using said seal secret key. In other words, no one can generate the sealed file after the seal management apparatus 1 deletes the seal secret key. The sealed file is the one and only file that contains the signature of the seal secret key.

(8) The seal management apparatus 1 transmits the seal identifier to the user U of the seal in some way. Here, the "some way" can be any method as long as the user U can acquire the seal identifier. The seal identifier may be transmitted, for example, electronically using the Internet as shown in FIG. 1, or may be stored in a recording medium such as Universal Serial Bus (USB) memory and sent by mail.

Due to the nature of public key cryptography in general, it is considered difficult to find a secret key corresponding to a public key from the public key within a realistic time. Therefore, when the seal management apparatus 1 safely deletes the seal secret key after generating the sealed file, it becomes difficult to generate the sealed file using said seal secret key thereafter. Therefore, the seal management system S can increase the security of the electronic sealing used for confirmation of the source.

Figure 2:
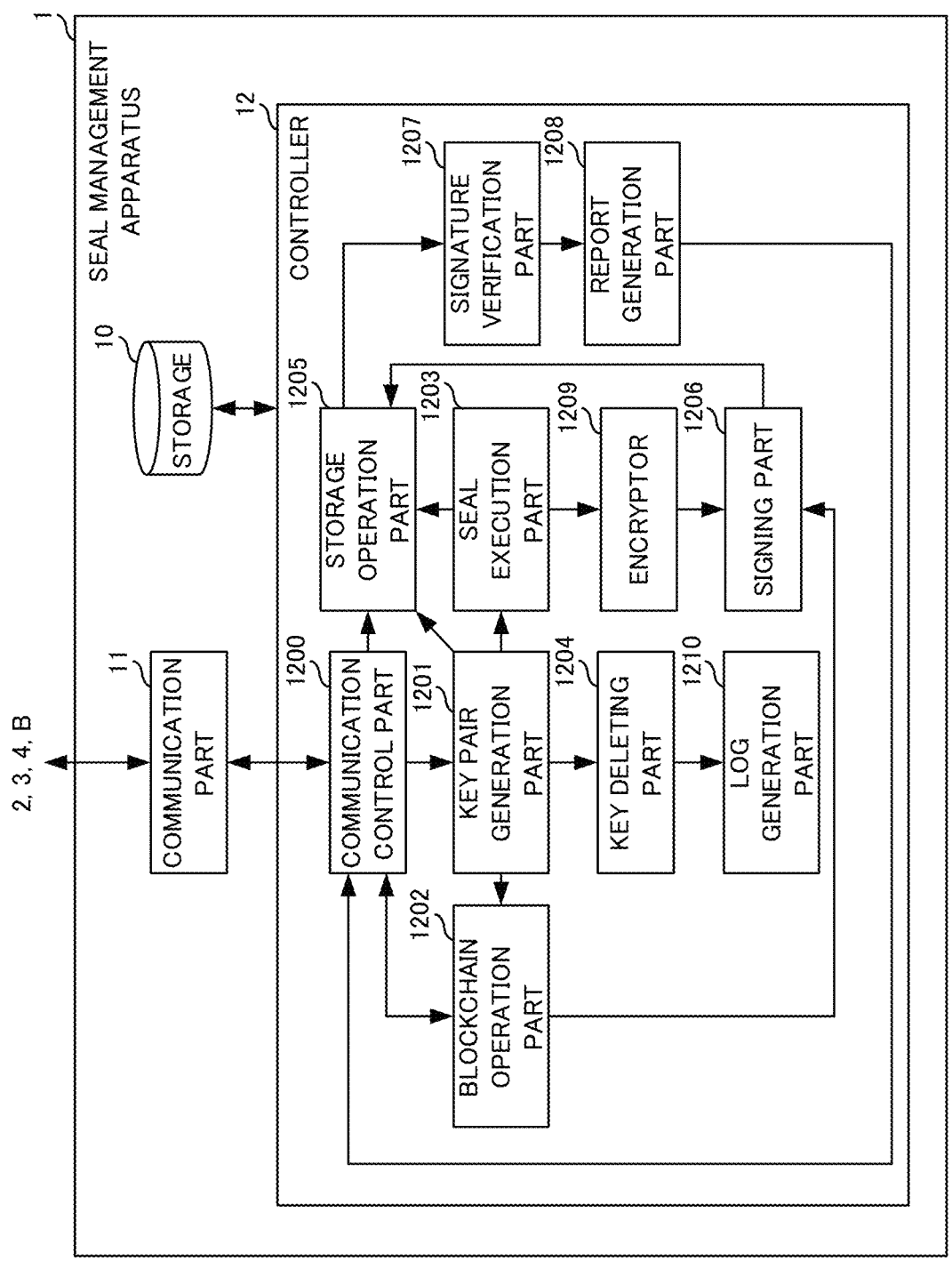
FIG. 2 schematically shows a functional configuration of a seal management apparatus according to the first embodiment.
Figure 3:
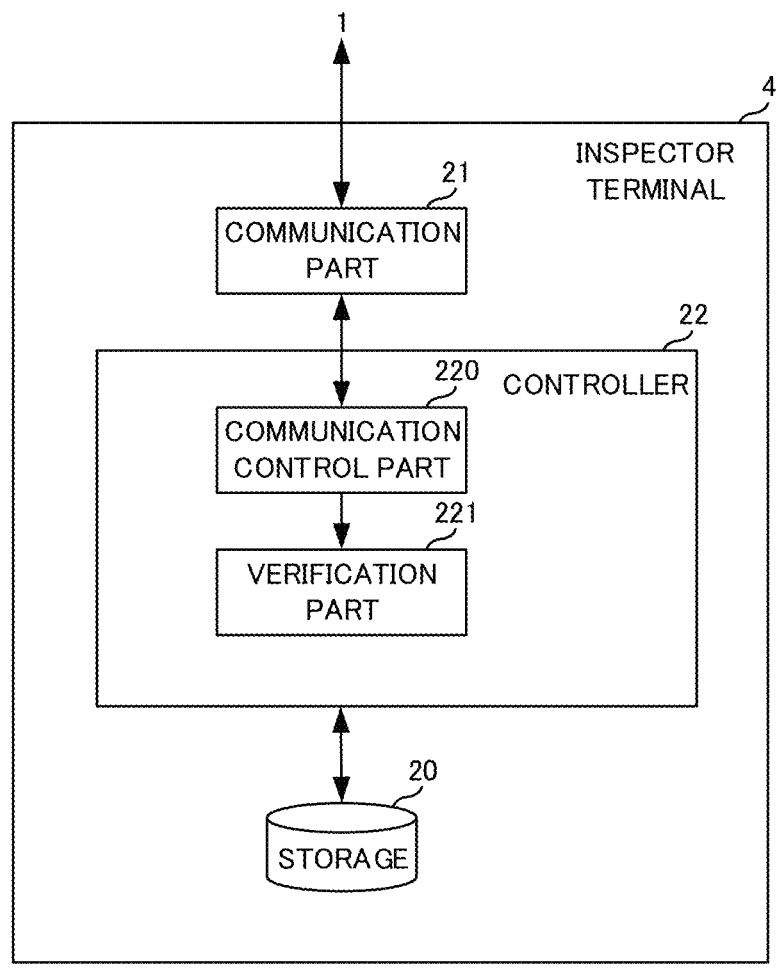
FIG. 3 schematically shows a functional configuration of a user terminal according to the first embodiment.

Functional Configuration of Seal Management Apparatus 1 According to the First Embodiment FIG. 2 schematically shows a functional configuration of the seal management apparatus 1 according to the first embodiment. Further, FIG. 3 schematically shows a functional configuration of the user terminal 2 according to the first embodiment. The seal management apparatus 1 includes a storage 10, a communication part 11, and a controller 12. Furthermore, the user terminal 2 includes a storage 20, a communication part 21, and a controller 22.

In FIGS. 2 and 3, arrows indicate main data flows, and there may be data flows not shown in FIG. 2 or 3. In FIGS. 2 and 3, each functional block does not have to have a hardware (device) unit configuration, and may have a functional unit configuration. Therefore, the functional block shown in FIGS. 2 and 3 may be implemented in a single device, or may be implemented separately in a plurality of devices. Sending and receiving of data between functional blocks may be performed via any means such as a data bus, a network, a portable storage medium, or the like.

The storage 10 is a large-capacity storage such as a Read Only Memory (ROM) for storing Basic Input Output System (BIOS) or the like of a computer realizing the seal management apparatus 1, a Random Access Memory (RAM) serving as the working memory of the seal management apparatus 1, and an Hard Disk Drive (HDD) or a Solid State Drive (SSD) for storing various information referred to when an Operating System (OS), an application program, or the application program is executed. Similarly, the storage 20 is a large-capacity storage such as a ROM for storing BIOS or the like of a computer realizing the user terminal 2, a RAM serving as the working memory of the user terminal 2, and an HDD or SSD for storing various information referred to when an OS, an application program, or the application program is executed.

The communication part 11 is a communication interface for the seal management apparatus 1 to communicate with an external apparatus, and is realized by a wireless communication module such as a known Local Area Network (LAN) module or a Wi-Fi (registered trademark) module. Similarly, the communication part 21 is a communication interface for the user terminal 2 to communicate with an external apparatus.

The controller 12 is a processor such as a Central Processing Unit (CPU) or a Graphics Processing Unit (GPU) of the seal management apparatus 1, and functions as a communication control part 1200, a key pair generation part 1201, a blockchain operation part 1202, a seal execution part 1203, a key deleting part 1204, a storage operation part 1205, a signing part 1206, a signature verification part 1207, a report generation part 1208, an encryptor 1209, and a log generation part 1210 by executing the program stored in the storage 10. Further, the controller 22 is a processor such as a CPU or GPU of the user terminal 2, and functions as a communication control part 220 and a verification part 221 by executing the program stored in the storage 20.

FIGS. 2 and 3 show examples in which the seal management apparatus 1 and the user terminal 2 are constituted by a single apparatus. But, the seal management apparatus 1 or the user terminal 2 may be realized by calculation resources such as a plurality of processors or memories, like a cloud computing system. In this case, each unit constituting the controller 12 or the controller 22 is realized by at least one of a plurality of different processors executing the program.

Various Keys and Identifiers Used in the Seal Management System S

FIG. 4 is a table showing various keys and identifiers used in the seal management system S according to the first embodiment. Before describing the processes performed in the seal management system S according to the first embodiment, various keys and identifiers transmitted and received in the seal management system S will be described with reference to FIG. 4.

As shown in FIG. 4, in the seal management system S according to the first embodiment, there are two types of secret keys, public keys, and identifiers, each for two different purposes of use. The two purposes of use are specifically for sealing and for affixing the signature of a provider of the sealing service (for example, an administrator of the seal management apparatus 1).

The seal public key is used by the seal management apparatus 1 to verify the seal affixed to the seal-required data, and is generated by the seal management apparatus 1 for each sealing service. The seal public key is generated by the seal management apparatus 1 and then stored in the blockchain B. The seal identifier is information used to retrieve the seal public key from the blockchain B, and is information corresponding one-to-one with the seal public key.

The seal secret key is used to seal the seal-required data, and is safely deleted so as not to be restored by the seal management apparatus 1 after being used by the seal management apparatus 1 for sealing. This ensures that once the seal secret key is used for the sealing service, no one can seal with the same seal secret key.

The service secret key is used by a provider of the sealing service such as the administrator of the seal management apparatus 1 to sign the sealed file, and is generated by the seal management apparatus 1. The service secret key is safely stored in the storage 3 by the seal management apparatus 1 in a similar way as in conventional electronic signature technology. The service public key is used by the seal management apparatus 1 to verify the signature affixed to the sealed file, and is generated by the seal management apparatus 1. The service public key is generated by the seal management apparatus 1 and then stored in the blockchain B.

The service identifier is information used to retrieve the service public key from the blockchain B, and corresponds one-to-one with the service public key. The service identifier is stored in the storage 3, and is also used as information for retrieving the service secret key from the storage 3.

Process of Seal Management Method Executed by Seal Management System S

Next, the processes of the seal management method executed by the seal management system S will be described with reference to FIGS. 2 to 9.

Sealing Operation

Figure 5:
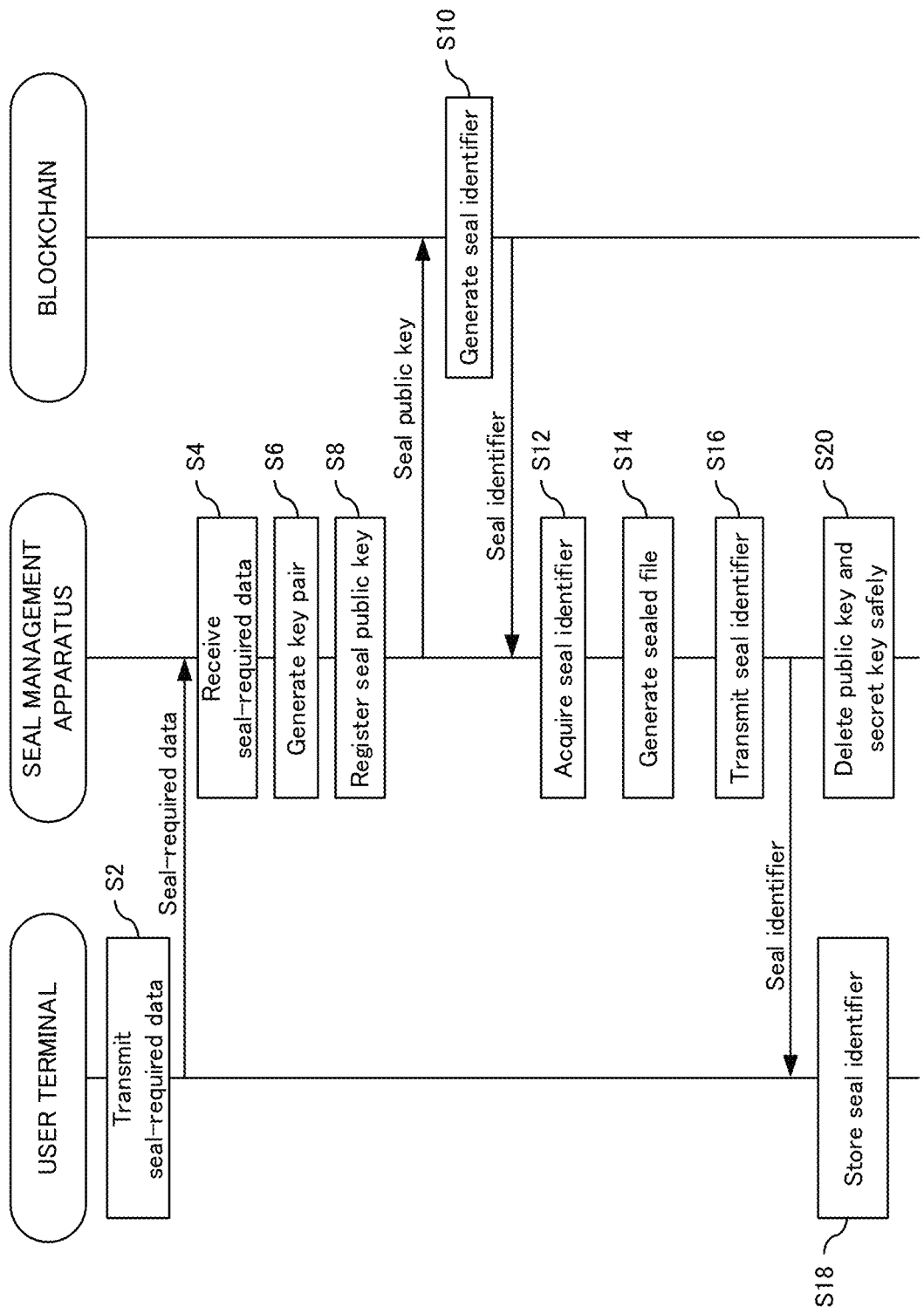
FIG. 5 is a sequence diagram for explaining a sealing process executed in the seal management system according to the first embodiment.

FIG. 5 is a sequence diagram for explaining a sealing process executed in the seal management system S according to the first embodiment. The sealing process according to the first embodiment will be described with reference to FIG. 5 below.

Under the control of the communication control part 220, the communication part 21 of the user terminal 2 transmits the seal-required data for receiving the sealing service from the seal management apparatus 1 (step S2). Hereinafter, in this disclosure, when the communication part 21 transmits information to the seal management apparatus 1 or receives information from the seal management apparatus 1, it is simply described as "the communication part 21 transmits (receives) data" or the like on the premise that communication is performed under the control of the communication control part 220.

The communication part 11 of the seal management apparatus 1 receives the seal-required data transmitted from the user terminal 2 under the control of the communication control part 1200 (step S4). In this sense, the communication part 11 functions as a receiving part for receiving the seal-required data. Hereinafter, in the present disclosure, when the communication part 11 transmits information to the user terminal 2 or the like, or receives information from the user terminal 2, it is simply described as "the communication part 11 transmits (receives) data" or the like on the premise that communication is performed under the control of the communication control part 1200.

When the communication part 11 receives the seal-required data, the key pair generation part 1201 generates a seal key pair containing a seal secret key for sealing seal-required data and a seal public key used to verify a seal, in the working memory (step S6). The blockchain operation part 1202 registers the seal public key generated by the key pair generation part 1201 in the blockchain B (step S8). The blockchain B generates a seal identifier for acquiring the seal public key from the blockchain B (step S10).

The blockchain operation part 1202 acquires the seal identifier from the blockchain B (step S12). The seal execution part 1203 generates a sealed file by affixing a signature of the seal secret key to the file containing the seal-required data and the seal identifier (step S14). As a specific example, the seal execution part 1203 generates a signature of a file containing the seal-required data, the seal identifier, and the seal data that is image data by using the seal secret key. The communication part 11 transmits the seal identifier to the user terminal 2 (step S16).

The user terminal 2 stores the seal identifier acquired from the seal management apparatus 1 in the storage 20 (step S18). The key deleting part 1204 deletes the seal secret key and the seal public key from the working memory in a non-restorable manner (step S20). This means that no one, including the seal management apparatus 1, will be able to generate the signature contained in the sealed file.

It should be noted that the log generation part 1210 of the seal management apparatus 1 may generate a log file indicating that the key deleting part 1204 deleted the seal secret key and the seal public key from the working memory, together with the generation date and time of the log file. This makes it possible to confirm later, together with the date and time, the fact that the seal public key is now stored only in blockchain B and the seal secret key does not exist.

Registration of Sealing Service

Figure 6:
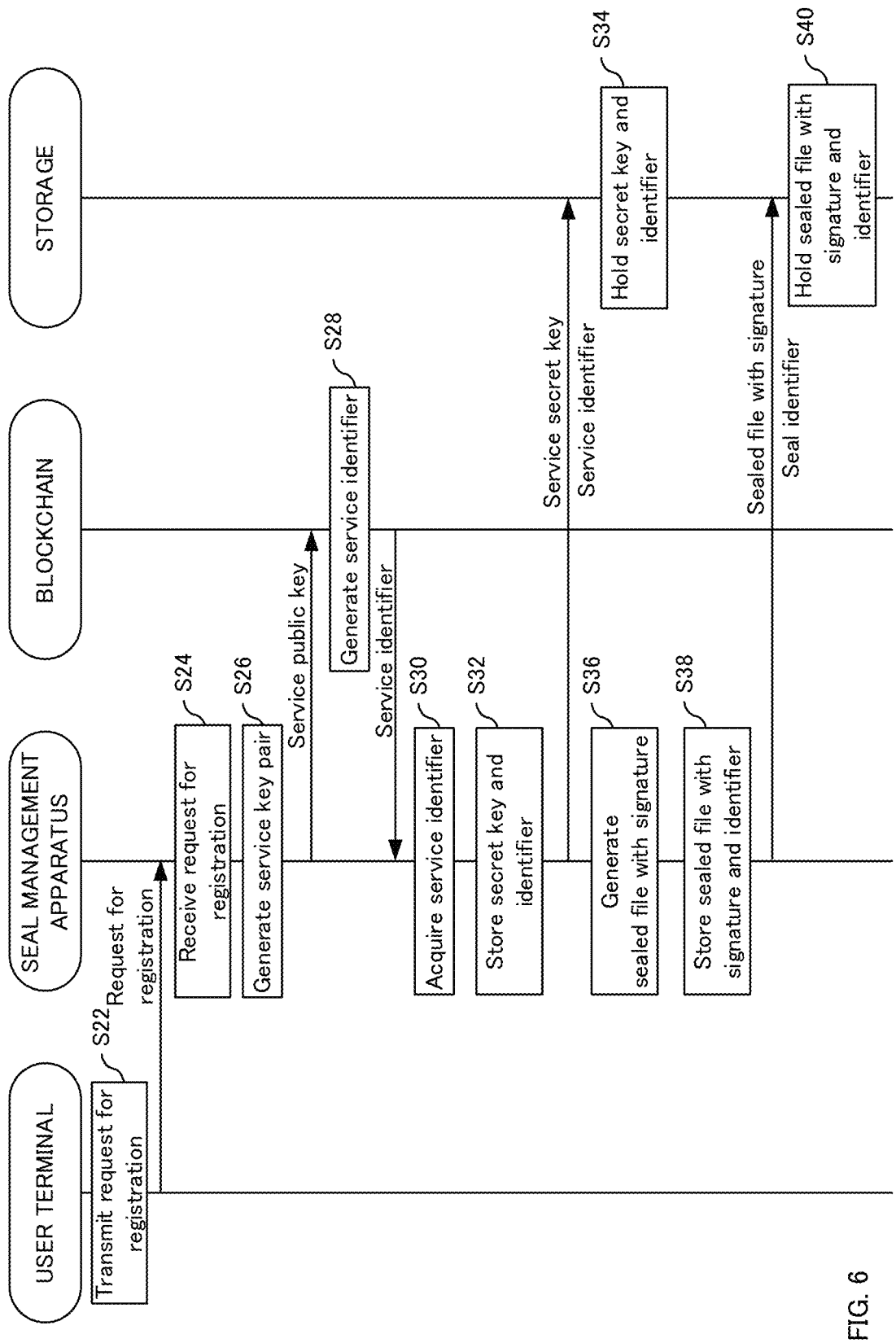
FIG. 6 is a sequence diagram for explaining a sealing service registration process executed in the seal management system according to the first embodiment.

FIG. 6 is a sequence diagram for explaining a sealing service registration process executed in the seal management system S according to the first embodiment. The seal management apparatus 1 can generate a sealed file containing a one and only signature, through the sealing operation shown in FIG. 5. On the other hand, if it can be proved that the sealed file was generated by the sealing service provided by the seal management apparatus 1, the reliability of the confirmation of the source of the sealed file increases. Therefore, the seal management system S according to the first embodiment also registers the sealing service that affixes the signature of the seal management apparatus 1 to the sealed file. A flow of registering the seal according to the first embodiment will be described with reference to FIG. 6 below.

The communication part 21 of the user terminal 2 transmits a request for registering the sealing service to the seal management apparatus 1 (step S22). The communication part 11 of the seal management apparatus 1 receives the request for registering the sealing service from the user terminal 2 (step S24).

When the communication part 11 receives the request for registration, the key pair generation part 1201 generates a service key pair containing a service secret key for affixing a signature to the sealed data sealed using the sealing service and a service public key used for verifying the signature (step S26). The blockchain operation part 1202 registers the service public key generated by the key pair generation part 1201 in the blockchain B, and generates a service identifier for acquiring the service public key from the blockchain B (step S28). The blockchain operation part 1202 acquires the service identifier from the blockchain B (step S30).

The storage operation part 1205 stores the service secret key and the service identifier in the storage 3 (step S32). Here, the storage 3 is a secure database accessible only by the seal management apparatus 1. The storage 3 holds the service secret key and the service identifier acquired from the seal management apparatus 1 (step S34).

The signing part 1206 generates a sealed file with a signature by affixing a signature to the data containing the sealed file and the service identifier using the service secret key (step S36). The storage operation part 1205 stores the sealed file with a signature in the storage 3 in association with the seal identifier (step S38). The storage 3 holds the sealed file with a signature in association with the seal identifier (step S40). Thus, the seal management apparatus 1 can generate a sealed file with its own signature affixed thereon.

Here, it would be convenient if the seal-required data can be stored together with personal information of a person who sealed it, contents of a contract, and the like in a state that is confidential to third parties, as additional information. Therefore, the encryptor 1209 may encrypt, using the service secret key, data to be confidential that is different from the seal-required data to generate encrypted data. In this case, the signing part 1206 may generate data, obtained by affixing the signature to a file containing the sealed file, encrypted data, and service identifier using the service secret key, as the sealed file with a signature.

As described above, in the RSA cryptosystem, data can be "encrypted" by processing other data to be confidential with a decryption algorithm that uses a secret key. Said data can be "decrypted" into the original data by processing with an encryption algorithm that uses a public key. The encryptor 1209 encrypts the data to be confidential using the service secret key, such that the data can be safely stored.

Acquisition of Seal Data

Figure 7:
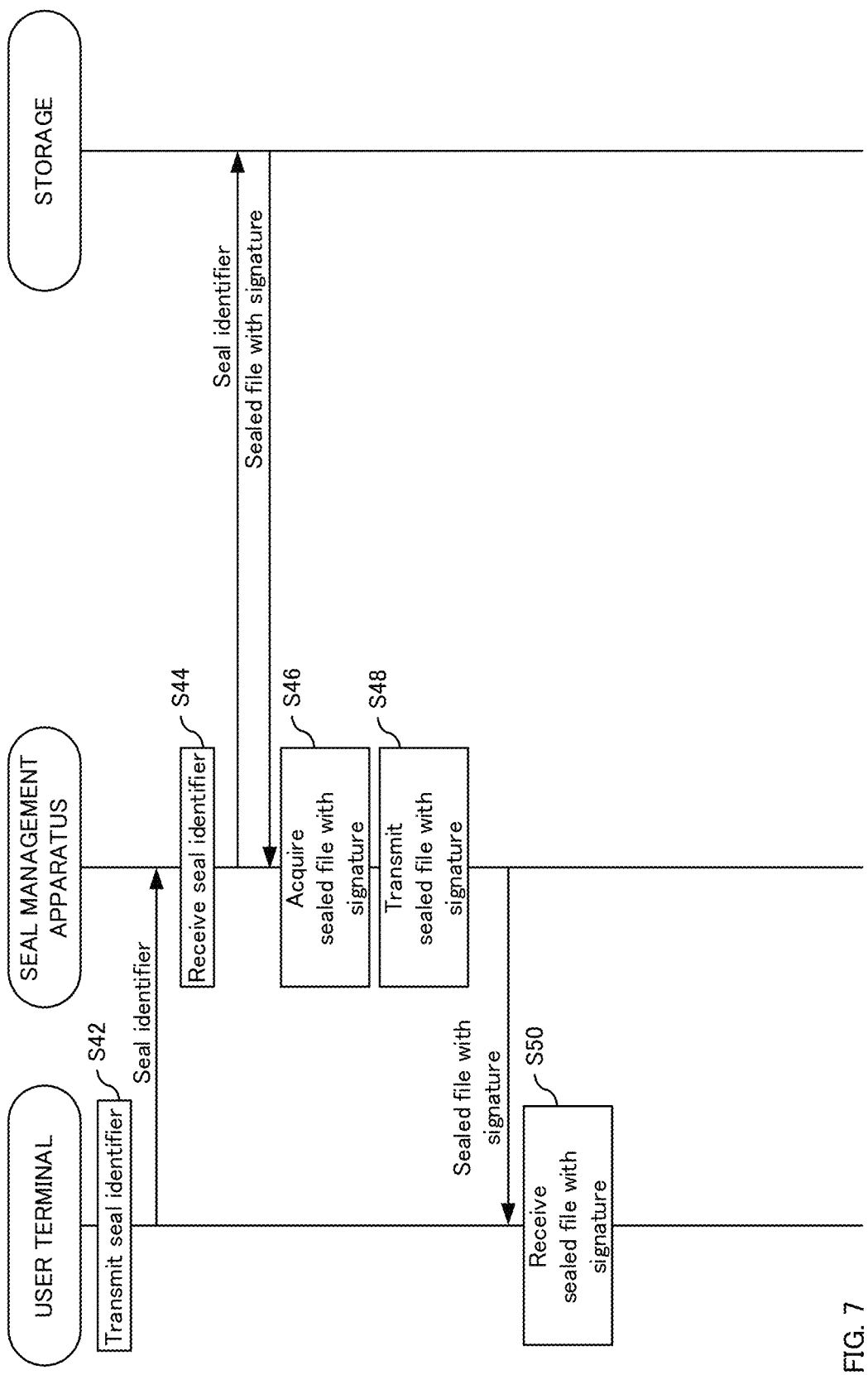
FIG. 7 is a sequence diagram for explaining a seal data acquisition process executed in the seal management system according to the first embodiment.

FIG. 7 is a sequence diagram for explaining a seal data acquisition process executed in the seal management system S according to the first embodiment. A process of issuance of the seal according to the first embodiment will be described referring to FIG. 7 below.

The communication part 21 of the user terminal 2 transmits the seal identifier to the seal management apparatus 1 (step S42). The communication part 11 of the seal management apparatus 1 receives the seal identifier from the user terminal 2 (step S44).

The storage operation part 1205 acquires the sealed file with a signature from the storage 3 using the seal identifier received by the communication part 11 (step S46). The communication part 11 transmits the sealed file with a signature to the user terminal 2 (step S48). The communication part 21 of the user terminal 2 receives the sealed file with a signature from the seal management apparatus 1 (step S50). As described above, the user terminal 2 can acquire the sealed file with a signature at any time by showing the seal identifier to the seal management apparatus 1. Since the storage 3 stores the sealed file with a signature, the user terminal 2 can save labor for managing the sealed file with a signature.

Inspection of Seal

Figure 8:
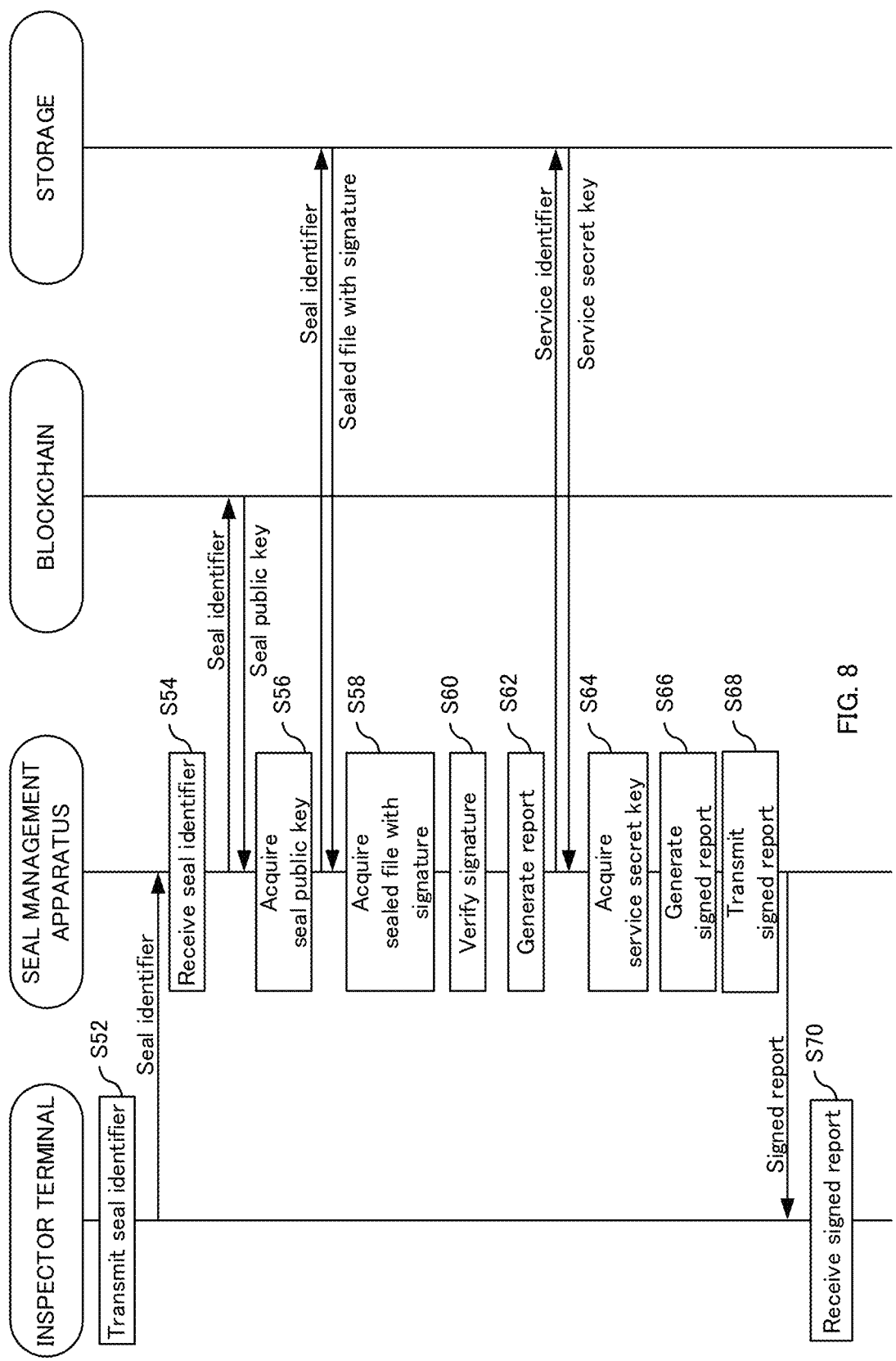
FIG. 8 is a sequence diagram for explaining an inspection process of a seal executed in the seal management system according to the first embodiment.

FIG. 8 is a sequence diagram for explaining an inspection process of the seal executed in the seal management system S according to the first embodiment. A process of inspecting the seal data according to the first embodiment will be described referring to FIG. 8 below.

A subject that performs inspection of the seal data may be the user terminal 2 used by the user U, or may be the inspector terminal 4 used by an inspector different from the user U. The inspector terminal 4 is the same as the user terminal 2 in the sense that it is a terminal that uses the sealing service of the seal management apparatus 1, and a functional configuration of the inspector terminal 4 is the same as the functional configuration of the user terminal 2 shown in FIG. 3. FIG. 8 shows an example in which the subject performing the inspection of the seal data is the inspector terminal 4. In this case, the inspector terminal 4 acquires the seal identifier from the user terminal 2 in advance.

The communication part 21 of the inspector terminal 4 used by the inspector who inspects the sealing service transmits the seal identifier to the seal management apparatus 1 (step S52). The communication part 11 of the seal management apparatus 1 receives the seal identifier from the inspector terminal 4 (step S54). The blockchain operation part 1202 uses the seal identifier to acquire the seal public key from the blockchain B (step S56).

The storage operation part 1205 uses the seal identifier to acquire the sealed file with a signature from the storage 3 (step S58). The signature verification part 1207 uses the seal public key to verify the signature of the seal secret key contained in the sealed file with a signature (step S60). The report generation part 1208 generates a report indicating a result of the verification by the signature verification part 1207 (step S62).

The storage operation part 1205 uses the service identifier contained in the sealed file with a signature to acquire the service secret key from the storage 3 (step S64). The signing part 1206 uses the service secret key to generate a signed inspection report that is a report generated by the report generation part 1208 with the signature affixed thereto (step S66). The communication part 11 transmits the signed inspection report to the inspector terminal 4 (step S68).

The inspector terminal 4 receives the signed inspection report of the seal management apparatus 1 from the seal management apparatus 1 (step S70). As a result, the inspector terminal 4 can acquire the inspection report that guarantees that the signature of the sealed file with a signature has been verified by the seal management apparatus 1. The inspector may verify the legitimacy of the seal from contents of the inspection report.

Verification of Inspection Report

Figure 9:
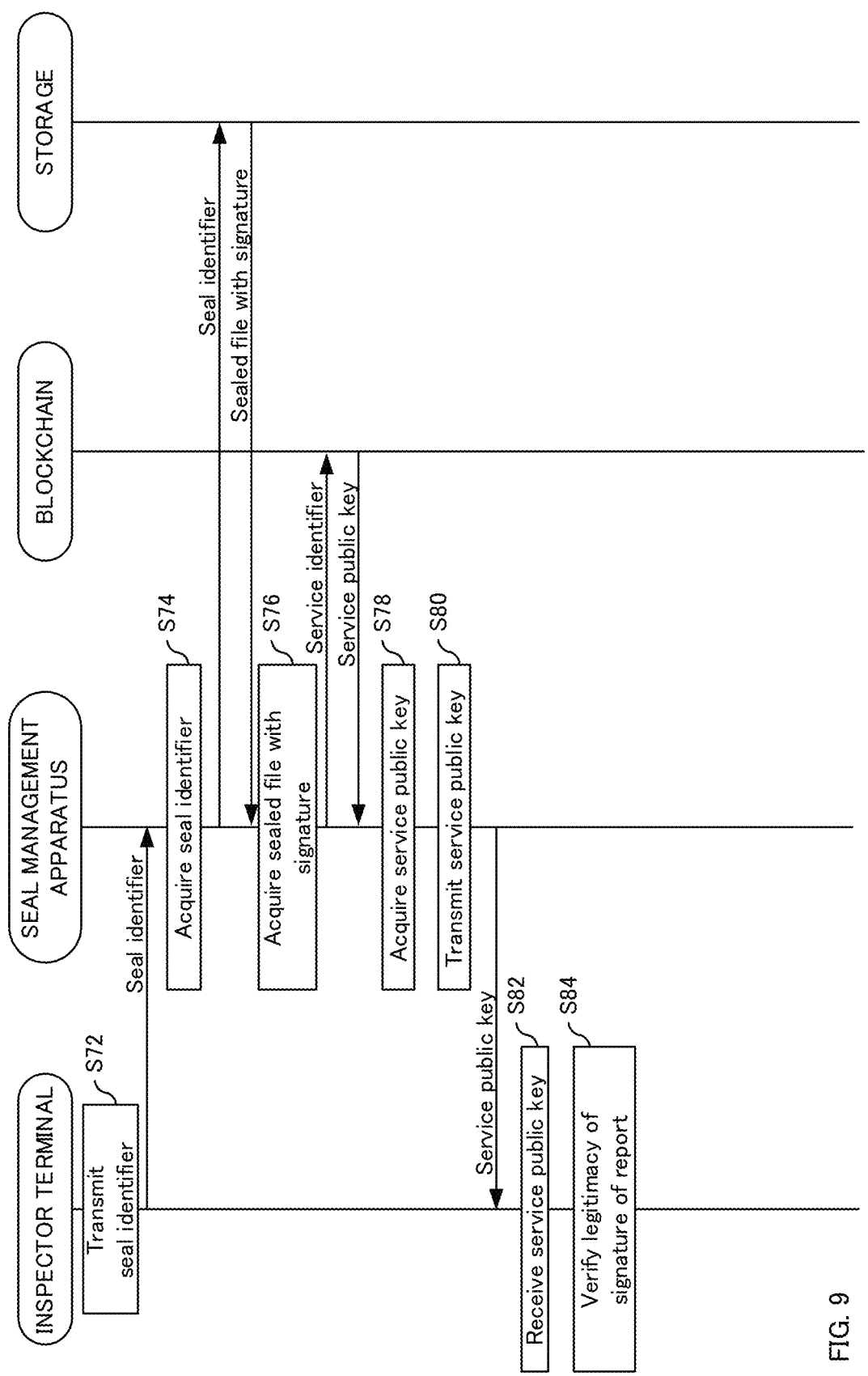
FIG. 9 is a sequence diagram for explaining an inspection report verification process executed in the seal management system according to the first embodiment.

FIG. 9 is a sequence diagram for explaining an inspection report verification process executed in the seal management system S according to the first embodiment. A process of verifying the inspection report according to the first embodiment will be described with reference to FIG. 9 below.

The communication part 21 of the inspector terminal 4 transmits the seal identifier to the seal management apparatus 1 (step S72). The communication part 11 of the seal management apparatus 1 receives the seal identifier from the inspector terminal 4 (step S74).

The storage operation part 1205 uses the seal identifier to acquire the sealed file with a signature from the storage 3 (step S76). The blockchain operation part 1202 uses the service identifier contained in the sealed file with a signature to acquire the service public key from the blockchain (step S78). The communication part 11 transmits the service public key acquired by the blockchain operation part 1202 to the inspector terminal 4 (step S80).

The communication part 21 of the inspector terminal 4 receives the service public key from the seal management apparatus 1 (step S82). The verification part 221 uses the received service public key to verify the legitimacy of the signature affixed to the signed inspection report (step S84). Thus, the inspector terminal 4 can verify whether or not the seal management apparatus 1 has affixed the signature to the inspection report.

Use Scene of Seal Management System S According to the First Embodiment

An example of a use scene of the seal management system S according to the first embodiment will be described.

The seal management system S according to the first embodiment is used to manage electronic receipts and the like, for example. In this case, the user U of the seal management apparatus 1 uses the user terminal 2 to transmit digital data of a receipt as the seal-required data to the seal management apparatus 1. The seal management apparatus 1 seals the digital data of the receipt, and then deletes the seal secret key used for the sealing. As a result, the receipt that is seal-required data becomes data that is difficult to falsify, such that the seal management apparatus 1 can guarantee the legitimacy of the receipt. In this way, the seal management apparatus 1 can guarantee the source of the data by sealing the electronic data, while enhancing the security of the seal at the same time.

Effect of Seal Management System S According to the First Embodiment

As described above, according to the seal management system S of the first embodiment, it is possible to increase the security of the electronic sealing for confirmation of the source.

Second Embodiment

The case where the seal management apparatus 1 uses the seal secret key to affix the signature to the seal-required data in the seal management system S according to the first embodiment has been explained. On the other hand, the seal management system S according to the second embodiment differs from the seal management system S according to the first embodiment at least in that, in addition to the seal management apparatus 1 affixing the signature to the seal-required data with the seal secret key, the user terminal 2 also affixes the signature to the seal-required data using the secret key of the user terminal 2.

The seal management system S according to the second embodiment will be described below with reference to the drawings, but portions that are the same as in the seal management system S according to the first embodiment will be omitted or simplified as appropriate. It should be noted that, in the seal management system S according to the second embodiment, it is assumed that the communication path between the seal management apparatus 1 and the user terminal 2 is an encrypted secure communication path.

Figure 10:
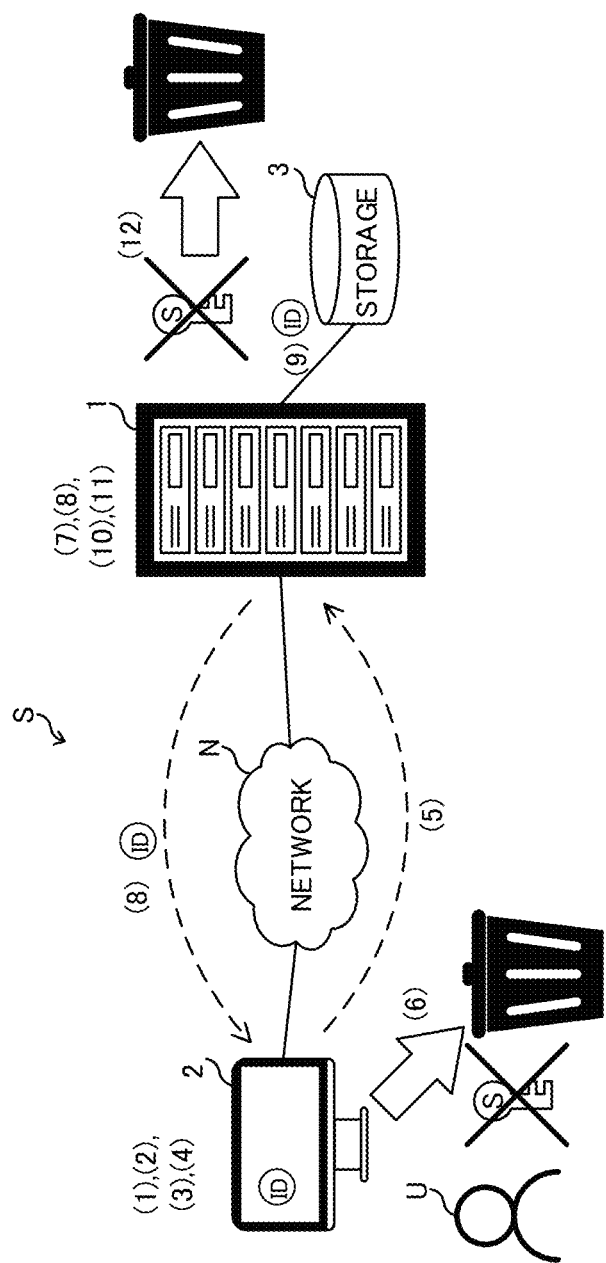
FIG. 10 schematically shows an outline of an entire configuration of a seal management system according to a second embodiment.

FIG. 10 schematically shows an outline of an entire configuration of the seal management system S according to a second embodiment. An outline of processing executed in the seal management system S according to the second embodiment and a data flow will be described below in the order of (1) to (12) with reference to FIG. 10, where the numbers thereof correspond to (1) to (12) in FIG. 10.

As shown in FIG. 10, the seal management system S according to the second embodiment includes the seal management apparatus 1, the user terminal 2, and the storage 3.

(1) The user terminal 2 generates a hash value of the seal-required data to be used for the sealing service. The seal-required data is digital data, and is data that the user U, the user of the user terminal 2, wants to be guaranteed to have existed at the date and time of the generation of the hash value of the seal-required data. Examples of the seal-required data include digital data of wills, contracts, sound sources, blueprints, digital art, and the like. The user terminal 2 generates the hash value by using a known hash function such as Secure Hash Algorithm 256-bit (SHA-256).

(2) The user terminal 2 generates verification information including the hash value of the seal-required data. The verification information is information including at least the hash value of the seal-required data, and may also include additional information such as the generation date and time of the hash value, the size of the seal-required data, and the like.

Generally, there is a one-to-one relationship between the hash value and the seal-required data from which said hash value was calculated. If the seal-required data is modified even slightly, the hash value generated from the modified seal-required data is greatly different from the hash value generated from the seal-required data before the modification. Therefore, by having the hash value of the seal-required data safely stored, it can be used to detect whether the seal-required data has been modified after the hash value thereof was generated.

(3) The user terminal 2 generates, in the working memory of the user terminal 2, (a) a user seal secret key for affixing a signature to the verification information and (b) a user public key corresponding to the user seal secret key.

(4) The user terminal 2 uses the user seal secret key to generate signed verification information in which the signature is affixed to the verification information.

(5) The user terminal 2 transmits the signed verification information and the user public key to the seal management apparatus 1. The signed verification information transmitted from the user terminal 2 to the seal management apparatus 1 does not include the seal-required data itself (6) The user terminal 2 safely deletes the user seal secret key used for affixing the signature to the verification information from the working memory.

Thus, the signature affixed to the signed verification information cannot be realistically affixed again even by the user terminal 2 that affixed said signature. This can practically guarantee that no data identical to the signed verification information can be generated, that is, the signed verification information is the one and only data generated by the user terminal 2.

(7) The seal management apparatus 1 receives the signed verification information and the user public key from the user terminal 2.

(8) The seal management apparatus 1 generates (a) a seal secret key for sealing the signed verification information and (b) a seal public key used for verifying the seal, in the working memory of the seal management apparatus 1.

(9) The seal management apparatus 1 stores the seal public key and the user public key in association with the seal identifier in the storage 3. Here, the seal identifier corresponds one-to-one with the seal public key and the user public key, and is information uniquely associated with each sealing service. Further, the storage 3 may be any device as long as information can be safely stored, and may not necessarily be a blockchain.

(10) The seal management apparatus 1 generates sealed verification information by affixing the signature of the seal secret key to the signed verification information received from the user terminal 2.

(11) The seal management apparatus 1 transmits the sealed verification information and the seal identifier to the user terminal 2.

(12) The seal management apparatus 1 safely deletes the seal secret key from the working memory. It should be noted that the user terminal 2 may safely delete the user seal secret key on condition that the user terminal 2 has received the sealed verification information and the seal identifier from the seal management apparatus 1, that is, on condition that a series of processes for acquiring the sealed verification information have been completed. This means that even if the process of generating the sealed verification information fails for some reason, the user terminal 2 can redo the process using the same user seal secret key.

Thus, the signature affixed to the sealed verification information cannot be realistically affixed again even by the seal management apparatus 1 that affixed the signature. This can practically guarantee that no data identical to the sealed verification information can be generated, that is, the sealed verification information is the one and only data generated by the seal management apparatus 1.

For example, even if the user terminal 2 could affix the signature to the seal-required data after the fact because the user terminal 2 did not delete the user seal secret key intentionally or negligently, the user terminal 2 cannot obtain the seal secret key and thus cannot generate the sealed verification information. In addition, even if a third party illegally breaks into the seal management apparatus 1, the third party cannot obtain the seal secret key if the seal secret key has been deleted, and therefore cannot generate the sealed verification information. Even if the third party succeeds in obtaining the seal secret key by some means, the third party cannot generate the sealed verification information unless the third party also obtains the user seal secret key at the same time.

As described above, in the seal management system S of the second embodiment, the seal management apparatus 1 and the user terminal 2 can mutually seal each other, thereby increasing the difficulty of falsifying information.

Figure 11:
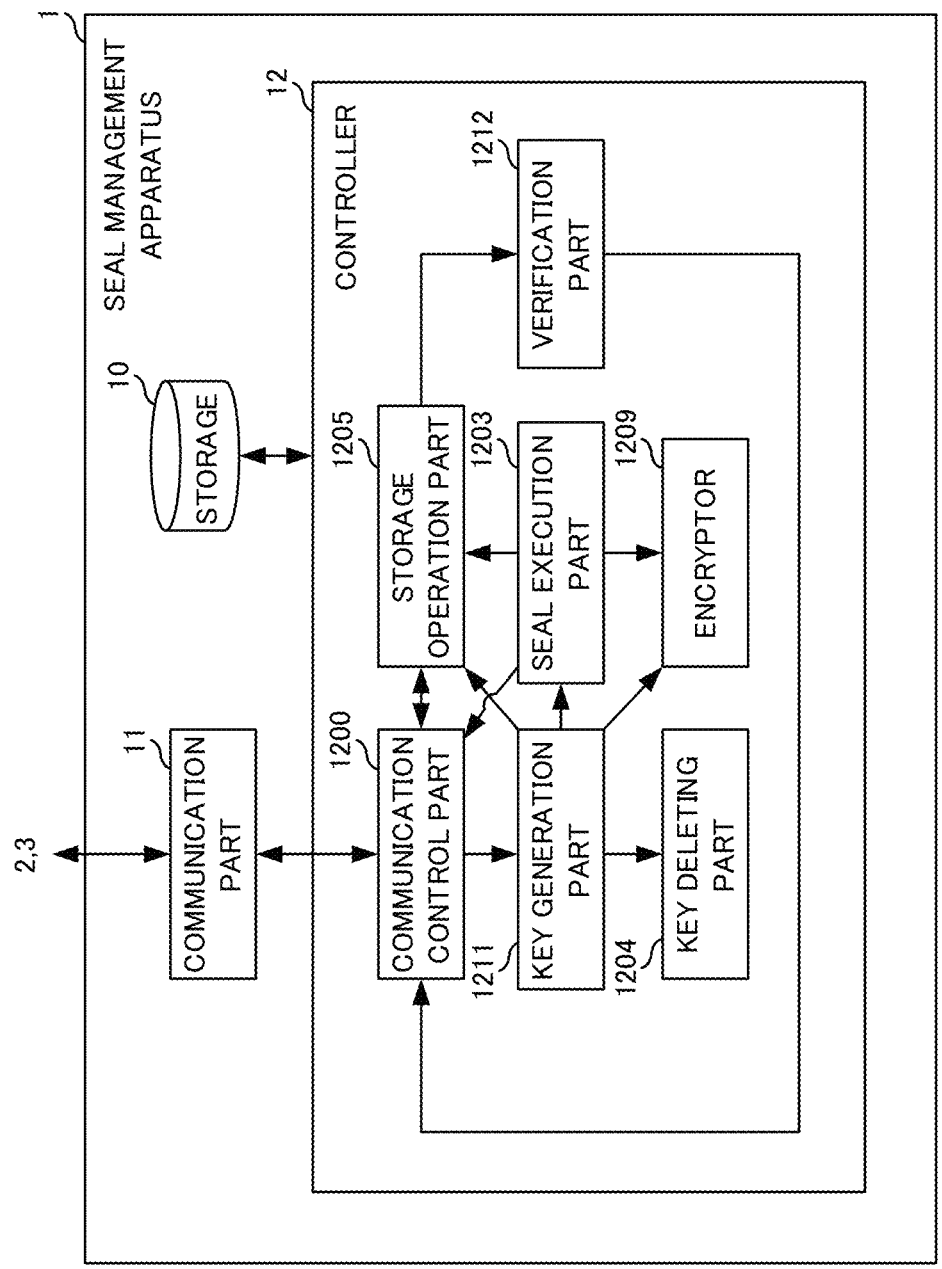
FIG. 11 schematically shows an outline of a functional configuration of a seal management apparatus according to the second embodiment.
Figure 12:
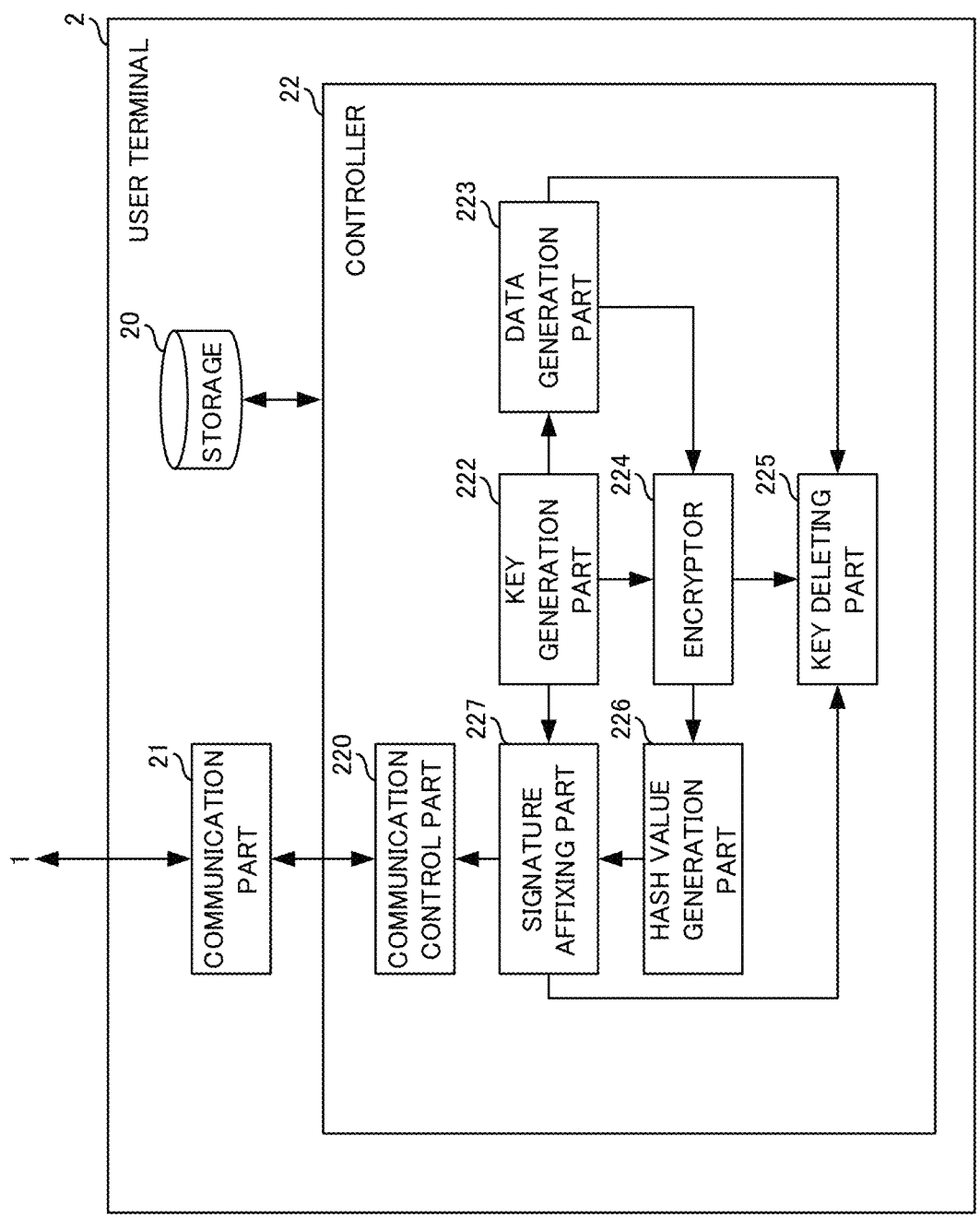
FIG. 12 schematically shows an outline of a functional configuration of a user terminal according to the second embodiment.

FIG. 11 schematically shows an outline of a functional configuration of the seal management apparatus 1 according to the second embodiment. Further, FIG. 12 schematically shows an outline of a functional configuration of the user terminal 2 according to the second embodiment. The seal management apparatus 1 includes the storage 10, the communication part 11, and the controller 12. Furthermore, the user terminal 2 includes the storage 20, the communication part 21, and the controller 22.

The controller 12 is a processor such as a CPU or GPU of the seal management apparatus 1, and functions as the communication control part 1200, the seal execution part 1203, the key deleting part 1204, the storage operation part 1205, the encryptor 1209, a key generation part 1211, and a verification part 1212 by executing the program stored in the storage 10. Further, the controller 22 is a processor such as a CPU or GPU of the user terminal 2, and functions as the communication control part 220, a key generation part 222, a data generation part 223, an encryptor 224, a key deleting part 225, a hash value generation part 226, and a signature affixing part 227 by executing the program stored in the storage 20.

A process of the seal management method executed by the seal management system S will be described with reference to FIGS. 13 to 16 below.

Generation of Seal-Required Data

Figure 13:
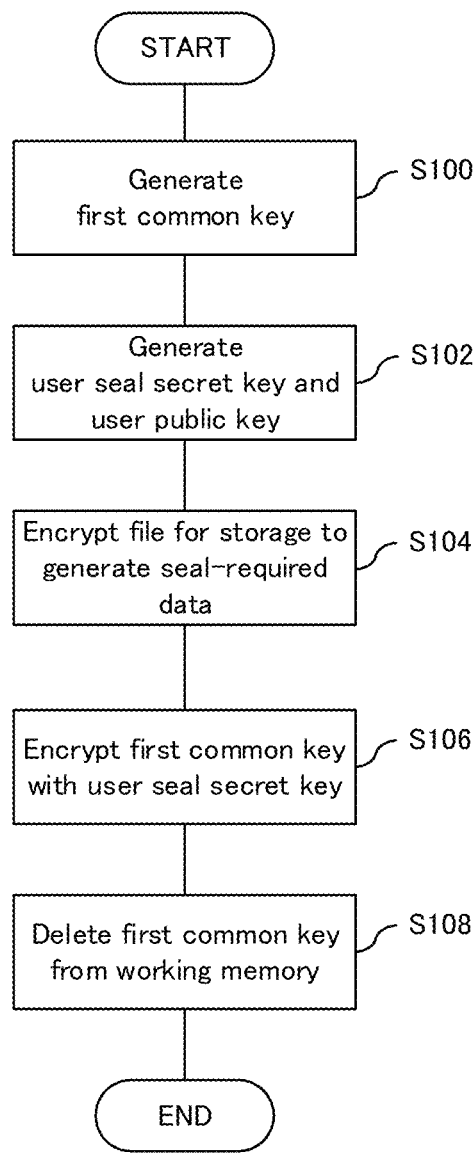
FIG. 13 is a flowchart for explaining an example of a process of generating seal-required data executed by the user terminal according to the second embodiment.

FIG. 13 is a flowchart for explaining an example of a process of generating the seal-required data executed by the user terminal 2 according to the second embodiment. The seal-required data is assumed to be a file for storage to be archived in FIG. 13, but it is understood by those skilled in the art that the seal-required data is not limited to data to be archived.

The key generation part 222 generates a first common key for encrypting the file to be archived in the working memory (step S100). The first common key is a key used in a cipher system in which the key used for encryption and decryption is common, and the key generation part 222 generates a common key of known Advanced Encryption Standard (AES), for example.

Further, the key generation part 222 generates, in the working memory, the user seal secret key and the user public key corresponding to the user seal secret key (step S102).

The data generation part 223 generates data obtained by encrypting the file for storage with the first common key as the seal-required data (step S104). It should be noted that the data generation part 223 may perform compression simultaneously with encryption of the file for storage. This allows the data generation part 223 to reduce the file size of the seal-required data when the file size of the file for storage is large.

The encryptor 224 encrypts the first common key using the user seal secret key to generate an encrypted first common key (step S106). The key deleting part 225 safely deletes the first common key from the working memory (step S108). As a result, there will be no other means to obtain the first common key but to decrypt the encrypted first common key. Also, the only key for decrypting the encrypted first common key will be the user public key.

Mutual Sealing Process

Figure 14:
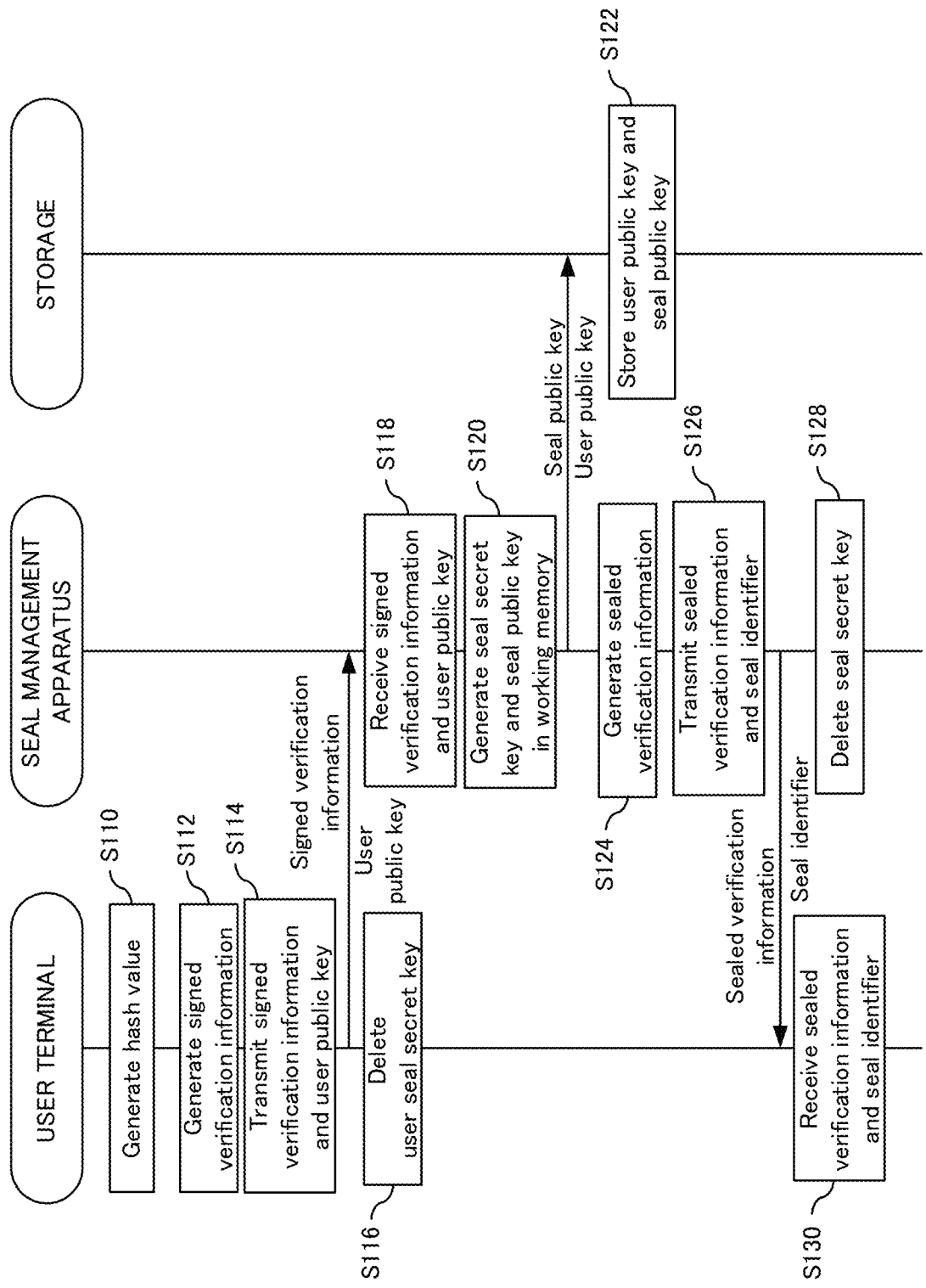
FIG. 14 is a sequence diagram for explaining a mutual sealing process executed in the seal management system according to the second embodiment.

FIG. 14 is a sequence diagram for explaining a mutual sealing process executed in the seal management system S according to the second embodiment.

The hash value generation part 226 of the user terminal 2 generates a hash value of the seal-required data to be used for the sealing service (step S110). The signature affixing part 227 of the user terminal 2 uses the user seal secret key to generate signed verification information by affixing the signature to the verification information containing the hash value (step S112).

The communication part 21 of the user terminal 2 transmits the signed verification information and the user public key to the seal management apparatus 1 (step S114). The key deleting part 225 of the user terminal 2 safely deletes the user seal secret key from the working memory of the user terminal 2 (step S116).

Here, the key deleting part 225 of the user terminal 2 may also safely delete the hash value and the user public key used to generate the signed verification information from the working memory. This prevents the user terminal 2 from leaking the hash value and the user public key from the user terminal 2.

The communication part 11 of the seal management apparatus 1 receives the signed verification information and the user public key from the user terminal 2 (step S118). The key generation part 1211 of the seal management apparatus 1 generates (a) a seal secret key for sealing the signed verification information and (b) a seal public key used for verifying the seal, in the working memory of the seal management apparatus 1 (step S120).

The storage operation part 1205 of the seal management apparatus 1 stores the seal public key and the user public key in association with the seal identifier in the storage 3 (step S122). The seal execution part 1203 of the seal management apparatus 1 generates the sealed verification information by affixing the signature of the seal secret key to the signed verification information (step S124).

The communication part 11 of the seal management apparatus 1 transmits the sealed verification information and the seal identifier to the user terminal 2 (step S126). The key deleting part 1204 of the seal management apparatus 1 safely deletes the seal secret key from the working memory of the seal management apparatus 1 (step S128).

The communication part 21 of the user terminal 2 receives the sealed verification information and the seal identifier from the seal management apparatus 1 (step S130). This allows the user terminal 2 to obtain the sealed verification information generated by mutual sealing using the secret key of each of the user terminal 2 and the seal management apparatus 1.

Seal Verification Process

Figure 15:
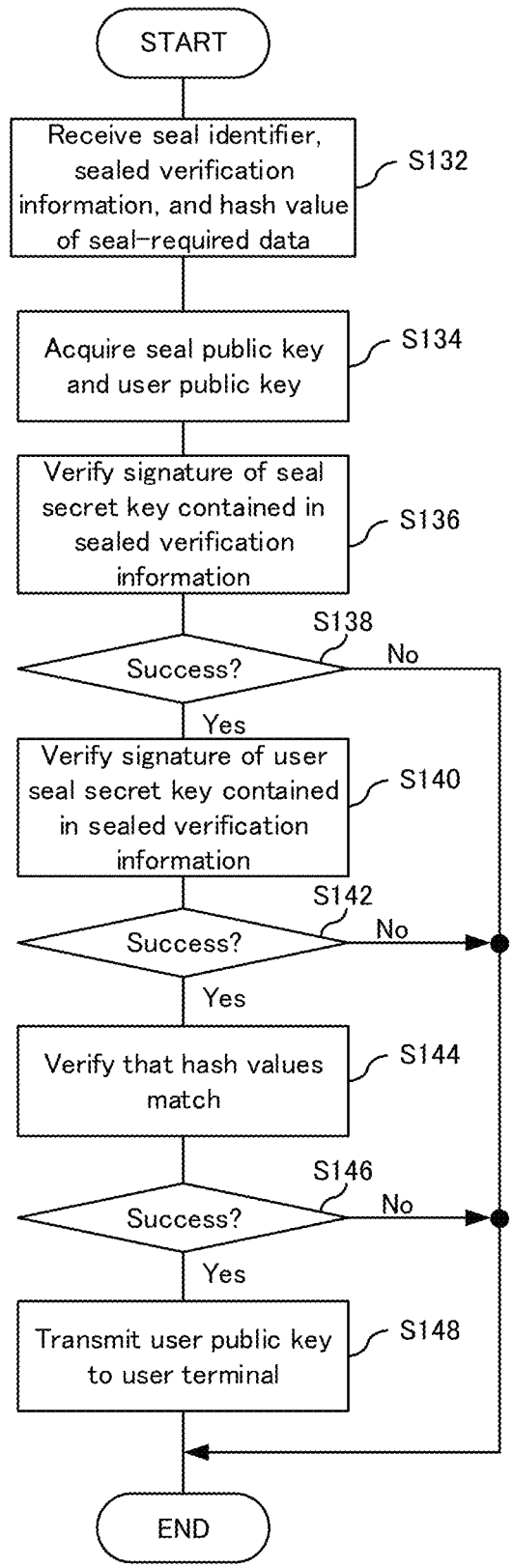
FIG. 15 is a flowchart for explaining a seal verification process executed by the seal management apparatus according to the second embodiment.

FIG. 15 is a flowchart for explaining a seal verification process executed by the seal management apparatus 1 according to the second embodiment.

The communication part 11 of the seal management apparatus 1 receives the seal identifier, the sealed verification information, and the hash value of the seal-required data to be verified from the user terminal 2 (step S132). The storage operation part 1205 of the seal management apparatus 1 uses the seal identifier to acquire the seal public key and the user public key from the storage 3 (step S134).

The verification part 1212 of the seal management apparatus 1 uses the seal public key to execute a first verification step that verifies the signature of the seal secret key contained in the sealed verification information (step S136). If the verification of the first verification step succeeds (Yes in step S138), the verification part 1212 of the seal management apparatus 1 uses the user public key to execute a second verification step that verifies the signature of the user seal secret key contained in the sealed verification information (step S140).

If the verification of the second verification step succeeds (Yes in step S142), the verification part 1212 of the seal management apparatus 1 executes a third verification step that verifies that the hash value of the seal-required data contained in the sealed file matches the hash value of the seal-required data to be verified (step S144).

If the verification of the third verification step succeeds (Yes in step S146), that is, on condition that the verification in each of the first verification step, the second verification step, and the third verification step succeeds, the communication part 11 of the seal management apparatus 1 transmits the user public key to the user terminal (step S148).

When the communication part 11 of the seal management apparatus 1 transmits the user public key to the user terminal or the verification part 1212 fails to verify at least one of the first verification step, the second verification step, and the third verification step (No in step S138, No in step S142, or No in step S146), the process in this flowchart ends.

As described above, in the seal management system S according to the second embodiment, the seal management apparatus 1 providing the sealing service verifies the seal of each of the seal management apparatus 1 and the user terminal 2 affixed to the sealed verification information and the legitimacy of the hash value contained in the sealed verification information. Since there is no need to transmit the seal public key, which is the public key of the seal management apparatus 1, to the user terminal 2, it is advantageous in that the security is improved compared to the case where the user terminal 2 performs these verifications.

Encryption Process Performed by Seal Management Apparatus 1

The seal management apparatus 1 may transmit information other than the sealed verification information to the user terminal 2. If said information is information to be confidential, the seal management apparatus 1 encrypts said information and transmits the encrypted information to the user terminal 2. Further, if the seal management apparatus 1, for example, transmits updating information of a program or firmware for realizing the seal management function to the user terminal 2, such information may have several megabytes to gigabytes in file size. In such a case, the seal management apparatus 1 uses known encryption and compression techniques to compress the file.

Figure 16:
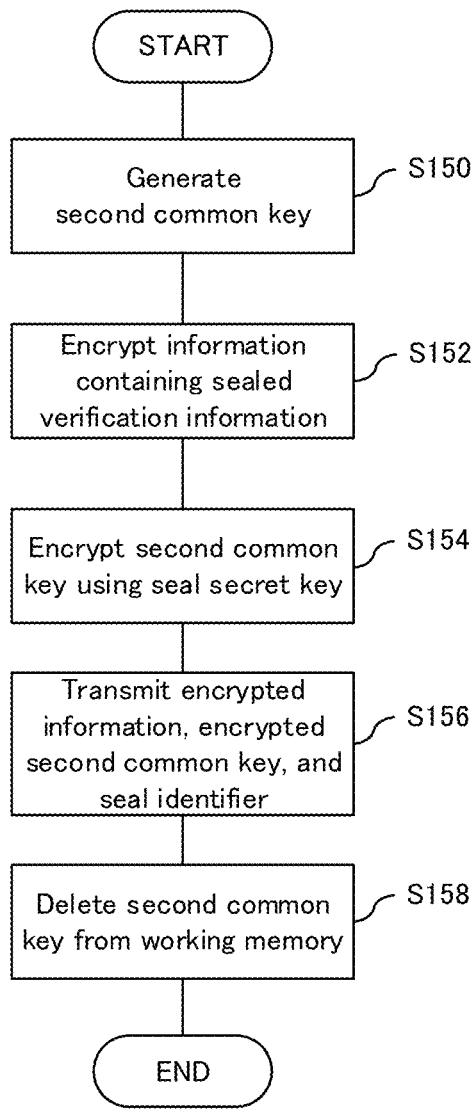
FIG. 16 is a flowchart for explaining an encryption process executed by the seal management apparatus according to the second embodiment.

FIG. 16 is a flowchart for explaining an encryption process executed by the seal management apparatus 1 according to the second embodiment.

The key generation part 1211 of the seal management apparatus 1 generates a second common key, which is a common key different from the first common key generated by the key generation part 222 of the user terminal 2, in the working memory of the seal management apparatus 1 (step S150). The encryptor 1209 of the seal management apparatus 1 encrypts the information containing the sealed verification information with the second common key (step S152). At this time, the encryptor 1209 may encrypt and compress the information containing the sealed verification information using, for example, a known technique such as a ZIP compression technique.

The encryptor 1209 of the seal management apparatus 1 encrypts the second common key using the seal secret key to generate an encrypted second common key (step S154). The communication part 11 of the seal management apparatus 1 transmits information including the encrypted sealed verification information, the encrypted second common key, and the seal identifier to the user terminal (step S156).

The key deleting part 1204 of the seal management apparatus 1 safely deletes the second common key from the working memory of the seal management apparatus 1 (step S158).

Use Scene of Seal Management System S According to the Second Embodiment

An example of a use scene of the seal management system S according to the second embodiment will be described.

The seal management system S according to the second embodiment is used, for example, as an electronic document archiver. In this case, the user U of the seal management apparatus 1 prepares (a) the hash value of the file for storage to be archived as the seal-required data, or (b) the hash value of the file for storage encrypted with the common key. The user U affixes the signature to the hash value using the user seal secret key, which is the secret key of the user terminal 2 used by the user U, and transmits said hash value to the seal management apparatus 1 together with the user public key. The user terminal 2 safely deletes the user seal secret key used for affixing the signature from the user terminal.

The seal management apparatus 1 generates the above-described sealed verification information by further affixing the signature to the signed hash value received from the user terminal 2, that is, the above-described signed verification information, using the seal secret key that is the secret key of the seal management apparatus 1. Thereafter, the seal management apparatus 1 safely deletes the seal secret key. As a result, the information mutually signed by the user terminal 2 and the seal management apparatus 1 becomes data that is very difficult to falsify. This is because a person who wants to falsify the information has to affix the signature, to the information he/she wants to falsify, with two secret keys: the user seal secret key, which is the secret key of the user terminal 2, and the seal secret key, which is the secret key of the seal management apparatus 1.

Further, the seal management system S according to the second embodiment can also be regarded as guaranteeing a fixed date of an electronic document. That is, the seal management apparatus 1 does not store the file for storage to be archived itself, but only guarantees that said file for storage existed on a specific date. That is, the seal management apparatus 1 stores the public key for verifying the legitimacy of the signature affixed to the hash value derived from the file for storage. While the file for storage may be several gigabytes in size even if compressed, the public key is only a few kilobits in size. Therefore, compared with the case where storing the file for storage itself, the seal management apparatus 1 can guarantee a large number of determined dates of data.

Effects of Seal Management System S According to the Second Embodiment

As described above, according to the seal management system S of the second embodiment, it is possible to increase the security of the electronic sealing for confirmation of the source.

Variation of Seal Management System S According to the Second Embodiment

The case where the seal management apparatus 1 verifies the sealed verification information has been described in the above. Alternatively or additionally, the user terminal 2 may execute the verification process. In this case, the user terminal 2 includes a verification part (not shown in figures). A variation of the seal management system S according to the second embodiment will be described below.

First, the communication part 21 of the user terminal 2 transmits the seal identifier of data to be verified to the seal management apparatus 1. The communication part 11 of the seal management apparatus 1 receives the seal identifier from the user terminal 2.

The storage operation part 1205 of the seal management apparatus 1 uses the seal identifier to acquire the seal public key and the user public key from the storage 3. The communication part 11 of the seal management apparatus 1 transmits the seal public key and the user public key to the user terminal 2.

The communication part 21 of the user terminal 2 receives the seal public key and the user public key from the seal management apparatus 1. The encryptor 224 of the user terminal 2 decrypts the encrypted second common key using the seal public key to acquire the second common key. Subsequently, the encryptor 224 decrypts the information containing the encrypted sealed verification information using the second common key to acquire the sealed verification information.

The verification part (not shown in figures) of the user terminal 2 uses the seal public key to verify the signature of the seal secret key contained in the sealed verification information. The verification part of the user terminal 2 uses the user public key to verify the signature of the user seal secret key contained in the sealed file. Further, the verification part of the user terminal 2 compares the hash value contained in the sealed verification information with the hash value of the seal-required data to be verified to verify the legitimacy of the seal-required data to be verified.

The encryptor 224 of the user terminal 2 decrypts the encrypted first common key using the user public key to acquire the first common key. Further, the encryptor 224 decrypts the seal-required data whose legitimacy has been verified with the first common key to acquire the file for storage. Thus, the user terminal 2 can generate the plaintext of the file for storage whose legitimacy has been verified.

The present invention is explained on the basis of the first embodiment and the second embodiment. The technical scope of the present invention is not limited to the scope explained in the above embodiments and it is possible to make various changes and modifications within the scope of the invention. For example, the specific embodiments of the distribution and integration of the apparatus are not limited to the above embodiments, all or part thereof, can be configured with any unit which is functionally or physically dispersed or integrated. Further, new exemplary embodiments generated by arbitrary combinations of them are included in the exemplary embodiments of the present invention. Further, effects of the new exemplary embodiments brought by the combinations also have the effects of the original exemplary embodiments.

What is claimed is:

1. A seal management method, wherein
a seal management apparatus for managing an electronic sealing service performs the steps of:
receiving seal-required data to be used for the sealing service from a user terminal of a user of the sealing service;
generating (a) a seal secret key for sealing the seal-required data and (b) a seal public key used for verifying the seal, in a working memory, in response to the seal-required data being received;
registering the seal public key in a blockchain;
acquiring a seal identifier that is an identifier for acquiring the seal public key registered in the blockchain from the blockchain;
generating a sealed file by affixing a signature of the seal secret key to a file containing the seal-required data and the seal identifier;
deleting the seal secret key from the working memory;
transmitting the seal identifier to the user terminal;
receiving a request for registering the sealing service from the user terminal;
generating (a) a service secret key for affixing a signature to the sealed data that has been sealed using the sealing service and (b) a service public key used for verifying the signature, in response to the request for registration being received;

registering the service public key in the blockchain;

acquiring a service identifier that is an identifier for acquiring the service public key registered in the blockchain, from the blockchain;

storing the service secret key and the service identifier in a storage;

generating a sealed file with a signature by affixing a signature to data containing the sealed file and the service identifier, using the service secret key; and storing the sealed file with a signature in the storage in association with the seal identifier.

2. The seal management method according to claim 1, wherein
the seal management apparatus further performs the steps of:
  receiving the seal identifier from the user terminal;
  acquiring the sealed file with a signature from the storage using the seal identifier; and
  transmitting the sealed file with a signature to the user terminal.

3. The seal management method according to claim 2, wherein
the seal management apparatus further performs the steps of:
  receiving the seal identifier from an inspector terminal used by an inspector who inspects the sealing service;
  acquiring the seal public key from the blockchain using the seal identifier;
  acquiring the sealed file with a signature from the storage using the seal identifier;
  verifying the signature of the seal secret key contained in the sealed file with a signature using the seal public key;
  generating a report indicating a result of the verification;
  acquiring the service secret key from the storage using the service identifier contained in the acquired sealed file with a signature;
  generating a signed inspection report to having a signature using the service secret key; and
  transmitting the signed inspection report to the inspector terminal.

4. The seal management method according to claim 3, wherein
the seal management apparatus further performs the steps of:
  receiving the seal identifier from the inspector terminal;
  acquiring the sealed file with a signature from the storage using the seal identifier;
  acquiring the service public key from the blockchain using the service identifier contained in the sealed file with a signature; and
  transmitting the acquired service public key to the inspector terminal, wherein the inspector terminal further performs the steps of:
    receiving the service public key from the seal management apparatus; and
    verifying legitimacy of the signature affixed to the signed inspection report using the received service public key.

5. The seal management method according to claim 1, wherein
the seal management apparatus further performs the step of:
  generating encrypted data by encrypting another piece of data different from the seal-required data using the service secret key, wherein
the generating the sealed file with a signature generates data, obtained by affixing a signature to a file containing the sealed file, the encrypted data, and the service identifier using the service secret key, as the sealed file with a signature.

6. The seal management method according to claim 1, wherein
the seal management apparatus further performs the step of:
  generating a log file indicating that the seal secret key and the seal public key have been deleted from the working memory.

7. The seal management method according to claim 1, wherein
the blockchain is a consortium blockchain.

8. An information processing method, wherein
a user terminal of a user of an electronic sealing service performs the steps of:
  generating a hash value of seal-required data to be used for the sealing service;
  generating (a) a user seal secret key for affixing a signature to a verification information containing the hash value and (b) a user public key corresponding to the user seal secret key, in a working memory;
  generating signed verification information having a signature using the user seal secret key;
  transmitting the signed verification information and the user public key to a seal management apparatus that manages the sealing service; and
  deleting the user seal secret key from the working memory; wherein
the seal management apparatus performs the steps of:
  receiving the signed verification information and the user public key from the user terminal of the user of the sealing service;
  generating (a) a seal secret key for sealing the signed verification information and (b) a seal public key used for verifying the seal, in a working memory;
  storing the seal public key and the user public key in association with an seal identifier in a storage;
  generating sealed verification information by affixing a signature of the seal secret key to the signed verification information;
  transmitting the sealed verification information and the seal identifier to the user terminal; and
  deleting the seal secret key from the working memory;
  receiving the seal identifier, the sealed verification information, and a hash value of the seal-required data to be verified, from the user terminal;
  acquiring the seal public key and the user public key from the storage using the seal identifier;
  a first verification step of verifying a signature of the seal secret key contained in the sealed verification information, using the seal public key;
  a second verification step of verifying a signature of the user seal secret key contained in the sealed verification information, using the user public key;
  a third verification step of verifying that a hash value of the seal-required data contained in the sealed verification information matches a hash value of seal-required data to be verified; and transmitting the user public key to the user terminal on condition that the verification in each of the first verification step, the second verification step, and the third verification step succeeds.

9. The information processing method according to claim 8, wherein the user terminal performs the steps of:
generating a first common key for encrypting a file for storage to be archived, in the working memory;
generating data obtained by encrypting the file for storage with the first common key as the seal-required data;
encrypting the first common key using the user seal secret key to generate an encrypted first common key; and
deleting the first common key from the working memory.

10. The information processing method according to claim 9, wherein the seal management apparatus performs the steps of:
generating a second common key different from the first common key in the working memory;
encrypting information containing the sealed verification information with the second common key; and
encrypting the second common key using the seal secret key to generate an encrypted second common key, wherein the transmitting to the user terminal transmits information including the encrypted sealed verification information, the encrypted second common key, and the seal identifier to the user terminal, wherein the seal management apparatus further performs the step of:
deleting the second common key from the working memory.

* * * * *